(12) United States Patent
Akutsu et al.

(10) Patent No.: US 12,418,072 B2
(45) Date of Patent: *Sep. 16, 2025

(54) BATTERY MODULE

(71) Applicant: HONDA MOTOR CO., LTD., Tokyo (JP)

(72) Inventors: Shigemitsu Akutsu, Saitama (JP); Shinji Fujimoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 394 days.

This patent is subject to a terminal disclaimer.

(21) Appl. No.: 18/048,448

(22) Filed: Oct. 21, 2022

(65) Prior Publication Data

US 2023/0155240 A1    May 18, 2023

(30) Foreign Application Priority Data

Nov. 16, 2021  (JP) .................................. 2021-186321

(51) Int. Cl.
*H01M 10/04* (2006.01)
*H01M 50/258* (2021.01)
*H01M 50/264* (2021.01)

(52) U.S. Cl.
CPC ..... *H01M 50/264* (2021.01); *H01M 10/0481* (2013.01); *H01M 50/258* (2021.01)

(58) Field of Classification Search
CPC ........... H01M 10/0481; H01M 50/258; H01M 50/264
See application file for complete search history.

(56) References Cited

U.S. PATENT DOCUMENTS 9,425,440 B2    8/2016    Kwon et al.
2013/0052516 A1    2/2013    Kim
(Continued)

FOREIGN PATENT DOCUMENTS

JP    2005069393 A    3/2005
JP    2008293771 A  * 12/2008
(Continued)

OTHER PUBLICATIONS

Office Action issued Jan. 24, 2025 in the U.S. Appl. No. 17/822,134.
(Continued)

*Primary Examiner* — Kevin E Yoon
(74) *Attorney, Agent, or Firm* — CKC & Partners Co., LLC

(57) ABSTRACT

Provided is a battery module which can appropriately pressurize the laminate, absorb displacement of the applied load accompanying charge and discharge of the laminated battery cells during use of the lithium ion battery, and fix pressure plates at ends in the lamination direction of the lithium ion battery laminate to a case. A battery module includes: a cell laminate in which a plurality of battery cells having a power generation element and external body covering the power generation element are laminated; a fastening member which fastens the cell laminate; end plates disposed at both ends in a lamination direction of the cell laminate; a fastening nut which fastens the fastening member and the end plate at an outer side of the cell laminate; a stay fastened by the fastening nut; and a case accommodating the cell laminate, in which the cell laminate is fixed to the case by the stay.

4 Claims, 9 Drawing Sheets

(56) References Cited

U.S. PATENT DOCUMENTS

| | | |
|---|---|---|
| 2014/0106193 A1 | 4/2014 | Kim et al. |
| 2015/0044536 A1 | 2/2015 | Kwon et al. |
| 2018/0358643 A1 | 12/2018 | Ko et al. |

FOREIGN PATENT DOCUMENTS

| | | | |
|---|---|---|---|
| JP | 2013045765 A | | 3/2013 |
| JP | 2013222554 A | | 10/2013 |
| JP | 2013235728 A | | 11/2013 |
| JP | 2014531111 A | | 11/2014 |
| JP | 2015106443 A | * | 6/2015 |
| JP | 2017027673 A | * | 2/2017 |
| JP | 2018081763 A | | 5/2018 |
| JP | 2018107078 A | * | 7/2018 |
| JP | 2018160334 A | * | 10/2018 |
| KR | 20130105272 A | | 9/2013 |
| KR | 20170072123 A | | 6/2017 |
| KR | 20190110349 A | | 9/2019 |
| KR | 20210110046 A | | 9/2021 |

OTHER PUBLICATIONS

Notification of Reasons for Refusal issued Dec. 3, 2024 in the JP Patent Application No. 2021-162924.

\* cited by examiner

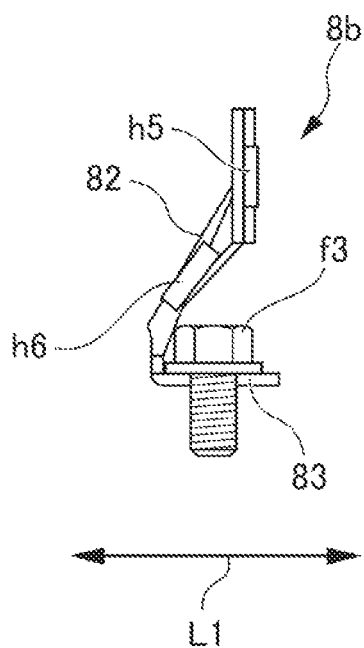

BATTERY MODULE

This application is based on and claims the benefit of priority from Japanese Patent Application No. 2021-186321, filed on 16 Nov. 2021, the content of which is incorporated herein by reference.

BACKGROUND OF THE INVENTION

Field of the Invention

The present invention relates to a battery module.

Related Art

In order to have a battery module serving as the power source of an electric vehicle or the like function appropriately, it is necessary to apply pressure in the lamination direction so as to pressurize the laminated battery cells. In particular, in a solid-state secondary battery made using a solid electrolyte as the electrolyte, it is necessary to apply somewhat large pressure compared to a liquid secondary battery made using a liquid electrolyte. As the pressurizing method, there is a method of joining an end plate and side plate at both end faces and lateral faces of a laminate, in a state preloading the laminate from both end faces of the laminate of battery cells.

In the above-mentioned pressurizing method, it is necessary to perform greater preloading than the target pressure on the laminate. In addition, since there is variation in the elastic modulus in the lamination direction of the laminate, there is a problem in that the residual load becomes non-uniform. Furthermore, as a result of the strength and rigidity of the end plate and side plate becoming necessary, there is also a problem in that the space of the member enlarges, and the occupancy of the battery cells in the battery module reduces. As another pressurizing method, technology which sandwiches the laminate by a pair of pressure plates, and pressurizing the pair of pressure plates by connection rods is disclosed (for example, refer to Patent Document 1).

Patent Document 1: Japanese Unexamined Patent Application, Publication No. 2008-293771

SUMMARY OF THE INVENTION

The technology disclosed in Patent Document 1 arranges a plurality of oblong lithium ion batteries on the same plane, and connects a pair of pressure plates by a central connection rod and peripheral connection rods. The pair of pressure plate are pressurized so as to approach each other, by fastening threaded members installed at both ends of the peripheral connection rods. However, in the above-mentioned technology, since displacement in the cell lamination direction arises upon the lithium ion battery expanding or contracting accompanying discharge/charge, it is difficult to fix the pressure plate of the lamination direction end of the lithium ion battery laminate to the case, during use in a lithium ion battery.

The present invention has been made taking account of the above, and has an object of providing a battery module which can appropriately pressurize the laminate, absorb displacement of the applied load accompanying charge and discharge of the laminated battery cells during use of the lithium ion battery, and fix pressure plates at ends in the lamination direction of the lithium ion battery laminate to a case.

A first aspect of the present invention relates to a battery module including: a cell laminate in which a plurality of battery cells having a power generation element and external body covering the power generation element are laminated; a fastening member which fastens the cell laminate; end plates disposed at both ends in a lamination direction of the cell laminate; a fastening nut which fastens the fastening member and the end plate at an outer side of the cell laminate; a stay fastened by the fastening nut; and a case accommodating the cell laminate, in which the cell laminate is fixed to the case by the stay.

According to the first aspect of the present invention, it is possible to provide a battery module which can absorb displacement accompanying expansion and contraction of cell laminates by way of stays.

According to a second aspect of the present invention, in the battery module as described in the first aspect, rigidity in the lamination direction of the stay is lower than rigidity in a direction orthogonal to the lamination direction of the stay.

According to the second aspect of the present invention, it is possible absorb displacement accompanying expansion and contraction of cell laminates by way of stays.

According to a third aspect of the present invention, in the battery module as described in the first or second aspect, the stay has a first sloped part which slopes in a widening direction downwards when viewing from the lamination direction.

According to the third aspect of the present invention, it is possible absorb displacement accompanying expansion and contraction of cell laminates by way of stays.

According to a fourth aspect of the present invention, in the battery module as described in any one of the first to third aspects, the stay has a second sloped part which slopes downward towards an outer side in the lamination direction of the cell laminate, from a fastening part with the fastening nut.

According to the fourth aspect of the present invention, it is possible absorb displacement accompanying expansion and contraction of cell laminates by way of stays.

According to a fifth aspect of the present invention, in the battery module as described in any one of the first to fourth aspects, a plurality of the fastening members is arranged, and the stay includes a plurality of holes through which a part of the fastening member inserts, and is formed integrally.

According to a fifth aspect of the present invention, it is possible to more precisely design the rigidity of the stay, and possible to improve the reliability of the battery module.

BRIEF DESCRIPTION OF THE DRAWINGS

FIG. 11 is a drawing viewing the stay in FIG. 10 from a lateral face.

DETAILED DESCRIPTION OF THE INVENTION

First Embodiment

A battery module according to a first embodiment of the present invention will be explained by referencing FIGS. 1 to 3. In each of the drawings shown below, the same reference symbols are assigned to identical portions and corresponding portions.

(Cell Laminate)

Figure 1:
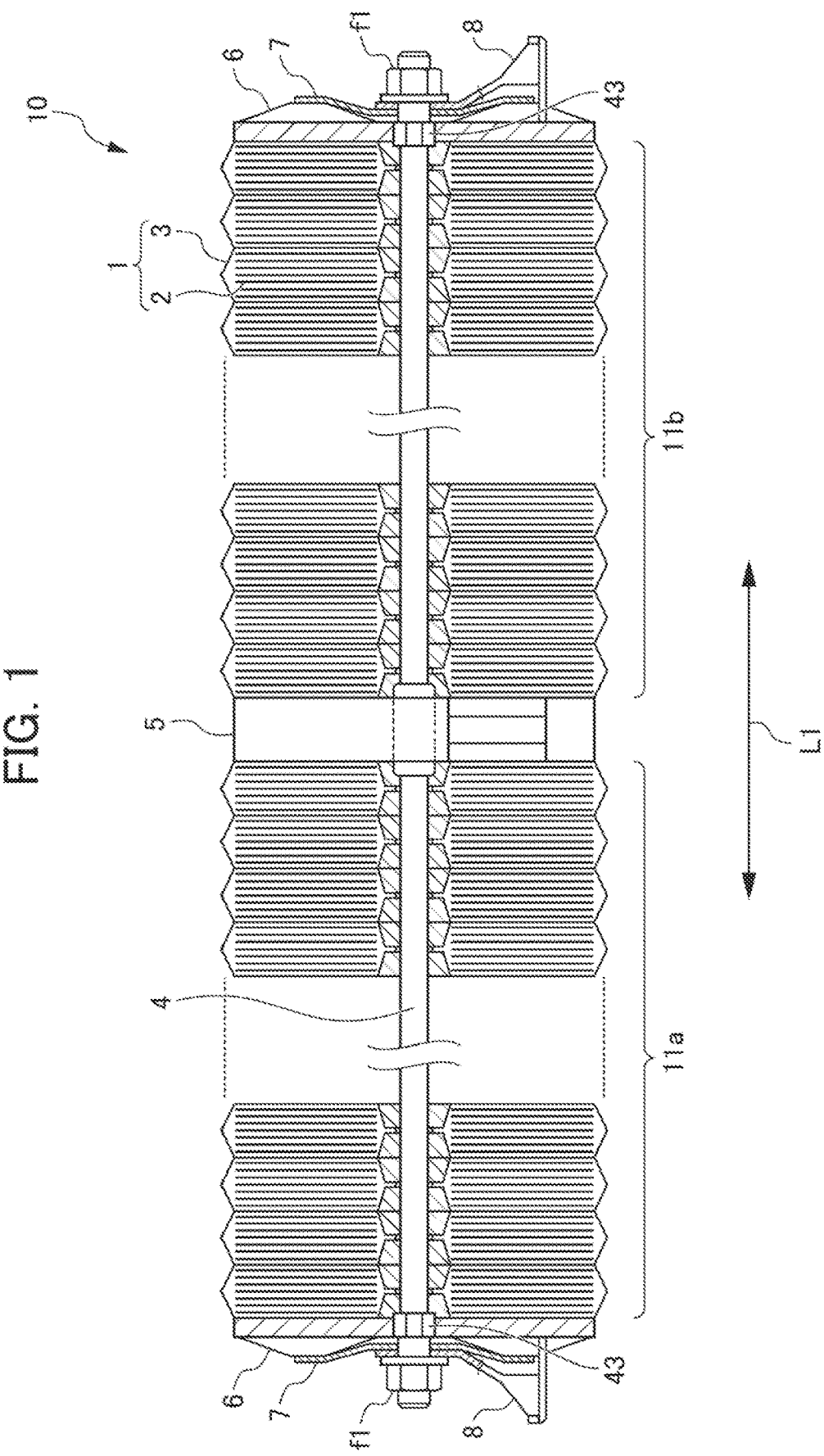
FIG. 1 is a partial cross-sectional view showing a battery module according to a first embodiment of the present invention shown in a side view.

A battery module 10 according to a first embodiment has cell laminates 11a, 11b in which a plurality of battery cells 1 having a power generation element 2 and external body 3 covering the power generation element 2 are laminated, as shown in FIG. 1. The power generation element 2, for example, is a solid-state battery made by a positive electrode layer, solid electrolyte layer and negative electrode layer being repeatedly laminated in this order. In the following explanation, the power generation element 2 is explained as a solid-state battery; however, the power generation element 2 may be an electrolytic solution-type battery including a liquid electrolyte. The battery module 10, in addition to the above, has a fastening member 4, center fixing member 5, end plates 6, pressure plates 7, stay 8 and fastening nuts f1.

As the materials constituting the positive electrode layer, solid electrolyte layer and negative electrode layer serving as the power generation element 2, it is possible to use known materials as materials constituting a solid-state battery.

The external body 3 accommodates the power generation element 2 inside. The external body 3 is not particularly limited; however, it is preferably a laminate film. By configuring the external body 3 with a laminate film, it is possible to reduce the volume of the external body 3, and possible to improve the energy density of the battery module. The laminate cell, for example, has a multi-layer structure in which a heat bonding resin layer such as polyolefin is laminated on the outside of a metal layer consisting of aluminum, stainless steel (SUS) or the like. As the external body 3, it is possible to use a metallic can.

The plurality of battery cells 1 constitute the cell laminates 11a, 11b by a plurality thereof being laminated in the same direction (lamination direction L1 shown in FIG. 1) as the lamination direction of the electrode layers constituting the power generation element 2. The cell laminates 11a, 11b are retained to be compressed by the end plates 6 from both end sides in the lamination direction L1. In the plurality of battery cells 1, as shown in FIG. 2, at the central part in a vertical-direction cross section along the lamination direction L1, first through holes h1 (hereinafter, may be described simply as "through hole h1") are respectively provided in a direction passing through each electrode layer constituting the power generation element 2. The through hole h1 is a hole part passing through the battery cell 1 with the external body 3. Although the shape of the through hole h1 is not limited, it preferably has a circular cross-sectional shape similarly to the cross-sectional shape of the fastening member 4 described later. As the formation method of the through hole h1, for example, it is possible to form by forming a laminate with the through hole in each of the respective electrode layers and solid-state electrolyte layers constituting the power generation element 2, enclose the above-mentioned laminate in the external body 3, join external bodies 3 at locations corresponding to the above-mentioned through hole by welding of the laminate film, and forming a through hole one size smaller than the above-mentioned through hole in the inner circumferential side of the above-mentioned through hole in the external body 3 by punch blanking or the like.

So that the through hole h1 passes through each, the plurality of battery cells 1 are arranged, and the fastening member 4 fastening the cell laminates 11a, 11b is arranged in the through hole h1. A pair of end plates 6 are fastened in a direction sandwiching the gap therebetween by the fastening members 4. It is thereby possible to pressurizing the cell laminates 11a, 11b without initial pressurizing (preloading).

(Fastening Member)

The fastening member 4 has a shaft forming the main body, a male screw part 41 formed at both ends of the shaft, an expanding diameter part 42 formed at the central part in the axial direction, and a locking part 43 arranged between the male screw part 41 and shaft. The expanding diameter part 42 is arranged within a second through hole h2 of a central fixing member 5 described later. The fastening member 4 has the shaft inserted in the through hole h1 of the cell laminates 11a, 11b, the male screw parts 41 extend from the hole parts h3, h4, h5 provided in the end plate 6, pressure plate 7 and stay 8, respectively, at both ends of the cell laminates 11a, 11b, and are threaded with the fastening nuts f1. The cross-sectional shape of the fastening member 4 is preferably circular from the viewpoint of making the cross-sectional stress uniform.

By inserting the fastening member 4 in the through hole h1 provided at the central part of the lamination surface of the cell laminates 11a, 11b, and pressurizing the cell laminates 11a, 11b using the pair of end plates 6 and fastening nuts f1, it is possible to make the surface pressure applied to the cell laminates 11a, 11b uniform. In addition, an outer frame fixing the cell laminate becomes unnecessary, and it is possible to improve the volume ratio of the power generation element 2 in the battery module 10; therefore, it is possible to improve the energy density of the battery module 10. It should be noted that, in the present invention, the fastening member 4 is not limited to being inserted in the through hole h1 provided at the central part of the lamination surface of the cell laminate. The fastening member 4 may be arranged at a location other than the central part of the lamination surface of the cell laminate.

The locking part 43, as shown in FIG. 1, is arranged inside of the hole part h3 formed in the end plate 6, which is in the vicinity of the fastening nut f1. The locking part 43, for example, is a member having a polygonal shape or sawtooth shape in a cross-sectional view. The locking part 43 may be formed integrally with the fastening member 4, or may be configured by a separate member from the fastening member 4, and adhered to the fastening member 4.

The locking part 43 has a function of accepting the torsional stress in the axial direction of the fastening member 4, by engaging in the hole part h3 formed in the end plates 6, and having an in-plane shape corresponding to the cross-sectional shape of the locking part 43. The torsional stress upon screwing the male screw part 41 with the fastening nut f1 is only transferred to the male screw part 41 of the fastening member 4 and the locking part 43, and is not transferred to the inner side of the cell laminates 11a, 11b from the locking part 43. Therefore, it is possible to prevent slack of the fastening nut f1 during use of the battery module 10 over a long period. In addition, by the tightening of the fastening nut f1, it is possible to apply larger axial force to the fastening member 4. In addition to the above, it becomes possible finely adjust the surface pressure applied to the cell laminates 11a, 11b according to the tightening degree of the fastening nut f1.

Figure 2:
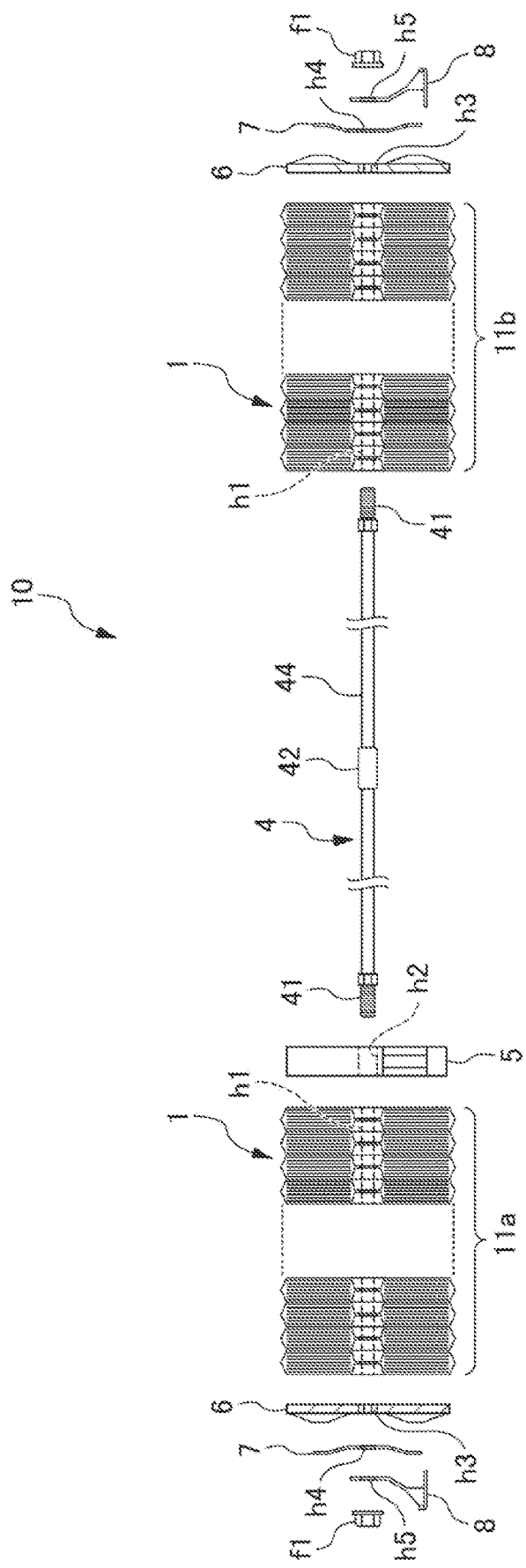
FIG. 2 is an exploded view showing the structure of the battery module in FIG. 1.

The diameter of a cross section in an axial direction of the shaft 44 of the fastening member 4 shown in FIG. 2 can be designed according to the surface pressure to be applied to the cell laminates 11a, 11b. By reducing the above-mentioned diameter, since the stress per unit area applied to the shaft 44 increases, it becomes possible to decrease the elastic modulus maintaining the distance between the end plates 6 in the compressing direction, and the variation width of surface pressure to be applied to the cell laminates 11a, 11b can be decreased.

(Central Fixing Member)

The central fixing member 5 is a member arranged between the plurality of battery cells 1, and is a member arranged at the center in the lamination direction L1 of the battery module 10, as shown in FIG. 1. The surface pressure applied to the cell laminates 11a, 11b is made uniform in the lamination direction L1, by the central fixing member 5. The central fixing member 5 only receives force by being compressed in the lamination direction L1; therefore, it is possible to configure by a light-weight metal such as aluminum, for example.

The central fixing member 5 is provided with the second through hole h2 (hereinafter may be described simply as "through hole h2") in which the diameter expanding part 42 of the fastening member 4 is arranged. As shown in FIG. 2, the central fixing member 5 is arranged so that the through hole h2 communicates with the through hole h1. The through hole h2 may be able to fix at a vertical face relative to the axial direction by the inlay fixing or the like with the diameter expanding part 42. It thereby becomes possible to position and fix the central fixing member 5 and fastening member 4, and it is possible to easily arrange the central fixing member 5 at the center in the lamination direction L1 of the battery module 10.

(End Plate)

The end plates 6 are a pair of members arranged at both ends in the lamination direction L1 of the cell laminates 11a, 11b. In the end plates 6, a hole part h3 into which the fastening member 4 can be inserted is formed, as shown in FIG. 2. The fastening member 4 is inserted in the hole part h3, and fastened by the fastening nut f1, whereby the end plates 6 clamp and retain the cell laminates 11a, 11b.

Figure 3:
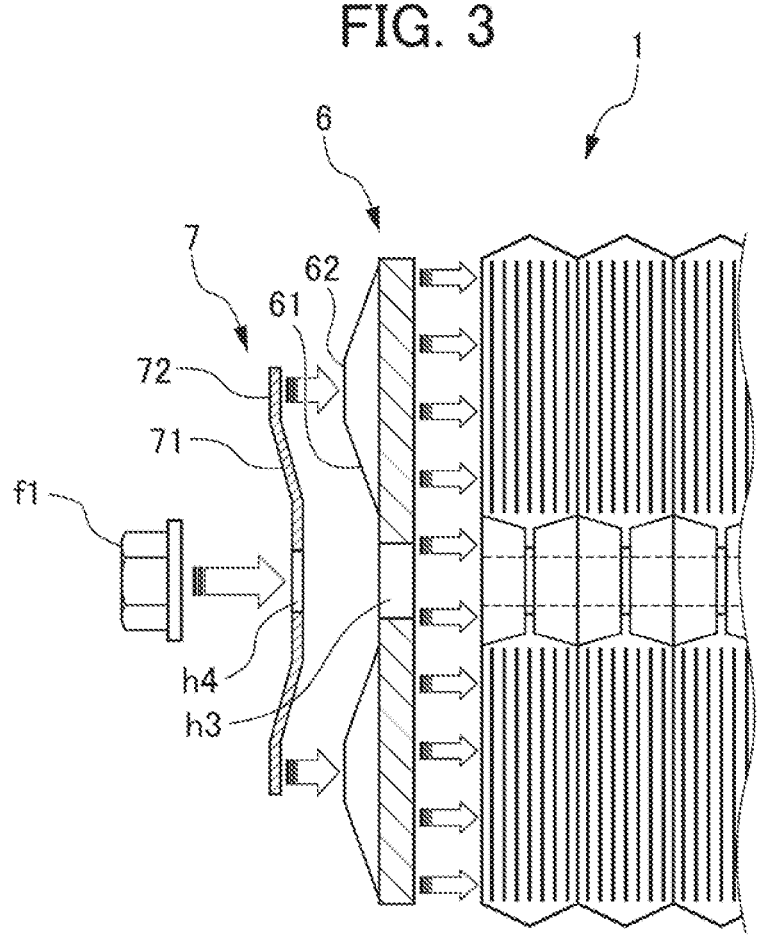
FIG. 3 is a view showing principle parts in FIG. 2 to be enlarged.

The end plate 6 has a sloped part 61 and a load point 62, as shown in FIG. 3. The load point 62 is a surface continuous with the sloped part 61, and is a substantially vertical surface relative to the lamination direction L1. The end plate 6 abuts the pressure plate 7 at a plurality of the load points 62. The surface pressure applied to the cell laminates 11a, 11b from the end plates 6 is thereby made uniform relative to the lamination plane.

(Pressure Plate)

The pressure plates 7 are a pair of members fastened by the fastening nut f1 together with the end plate 6. The pressure plate 7 is arranged at the outer side in the lamination direction L1 of the end plate 6 at both ends in the lamination direction L1 of the cell laminates 11a, 11b. The pressure plate 7 is an elastically deformable member, and is a member of leaf spring shape made of metal, for example. The hole part h4 into which the fastening member 4 can be inserted is formed in the pressure plate 7, as shown in FIG. 2. By the fastening member 4 being inserted in the hole part h4, and fastened by the fastening nut f1, the axial force from tightening of the fastening nut f1 is transferred to the end plate 6 via the pressure plate 7.

The pressure plate 7 has a sloped part 71 and load point 72, as shown in FIG. 3. The sloped part 71 is a surface sloping along the sloped part 61. The load point 72 is a surface continuous with the sloped part 71, and is a substantially vertical surface relative to the lamination direction L1.

(Stay)

The stays 8 are a pair of members fastened by the fastening nut f1 together with the end plate 6 and pressure plate 7. The stay 8 is a member for fixing the cell laminates 11a, 11b. The stay 8 is arranged at the outer side in the lamination direction L1 of the pressure plate 7, at both ends in the lamination direction L1 of the cell laminates 11a, 11b. In the stay 8, as shown in FIG. 2, a hole part h5 into which the fastening member 4 can be inserted is formed. The fastening member 4 is inserted into the hole part h5, and fastened by the fastening nut f1. By fixing the stay 8 using the fastening member 4, it is possible to decrease the installation space and parts count of the stay 8. The details of the configuration of the stay 8 will be explained in the following second embodiment.

Second Embodiment

Next, a second embodiment of the present invention will be explained by referencing FIGS. 4 to 9. In the following explanation, the same reference symbols are attached in the drawings for configuration which are similar to the above first embodiment, and explanations thereof may be omitted.

Figure 4:
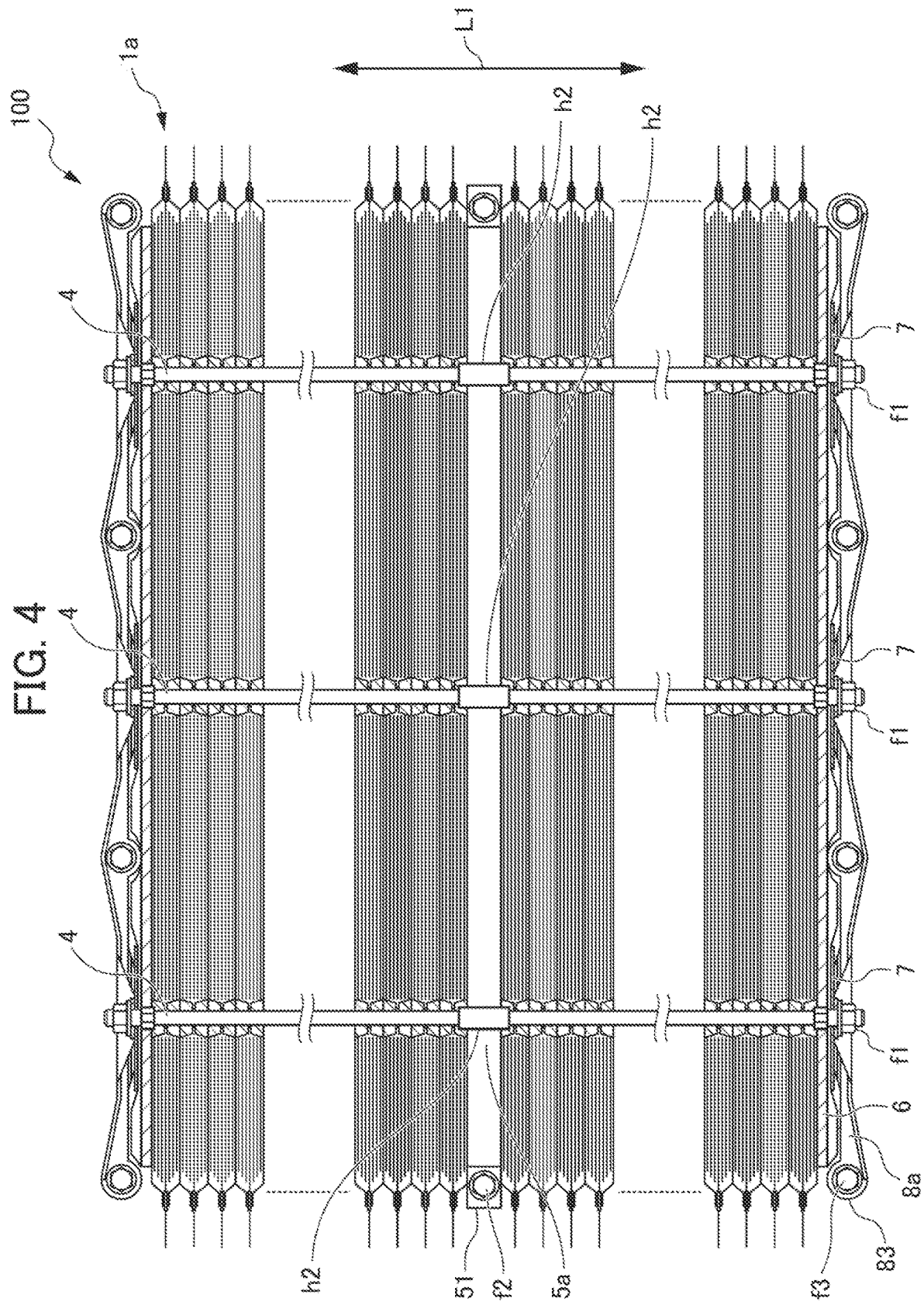
FIG. 4 is a partial cross-sectional view showing a battery module according to a second embodiment of the present invention in a top view.
Figure 5:
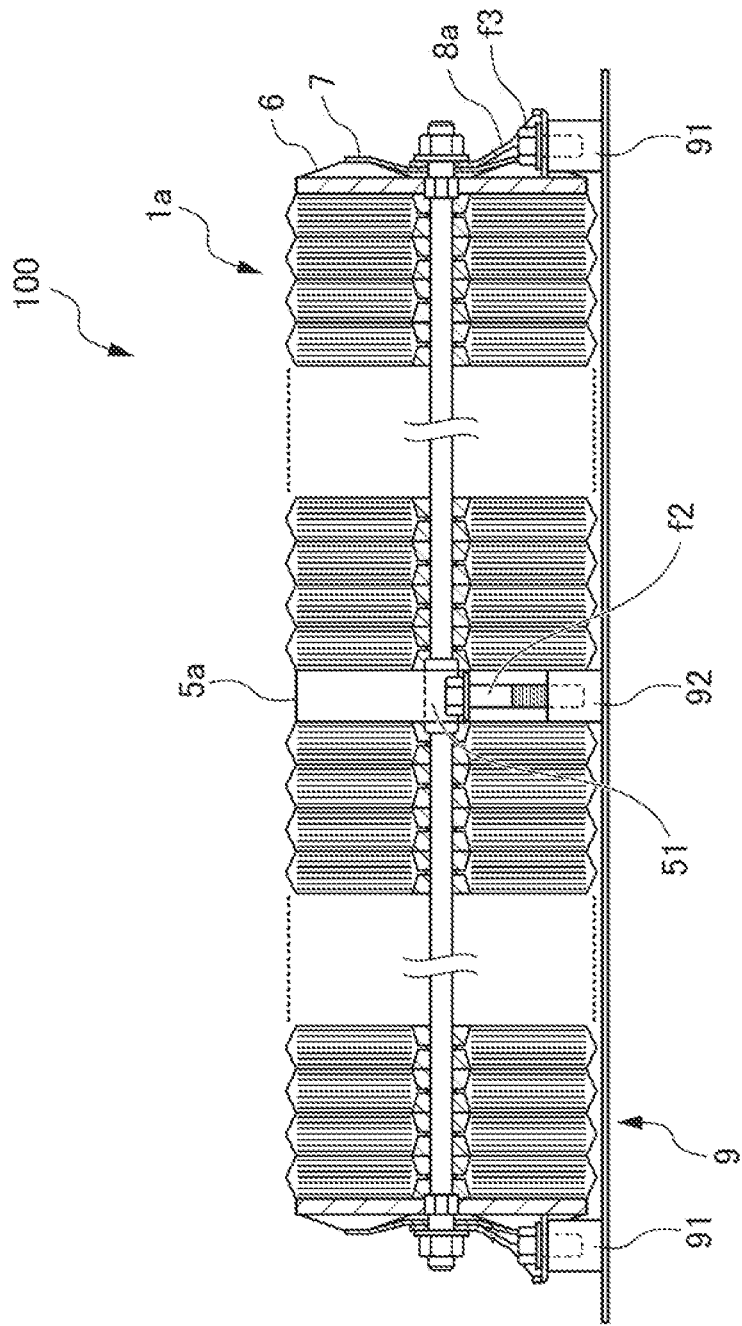
FIG. 5 is a partial cross-sectional view showing the battery module in FIG. 4 in a side view.

FIG. 4 is a top view of a battery module 100 according to the second embodiment. The battery module 100 is a module made into a larger size battery module by combining the battery modules 10. As shown in FIGS. 4 and 5, in the plurality of battery cells 1a, a plurality of hole parts are formed at the central part in a vertical direction cross section along the lamination direction L1, and a plurality of fastening members 4 (three in the present embodiment) are respectively inserted and arranged. The arranged number of fastening members 4 is not limited as described above, and may be two or four, for example. The battery module 100 includes a case 9 accommodating the laminate of the battery cells 1a, as shown in FIGS. 5 and 6.

A central fixing member 5a according to the present embodiment has a plurality of the through holes h2 into which the fastening member 4 is inserted. In addition, the central fixing member 5a has a connection part 51 with the case 9. The fastening bolt f2 is threaded to the connection part 51, and the central fixing member 5a and case 9 are connected. It is thereby possible to further raise the rigidity of the laminate of the battery cells 1a.

Figure 6:
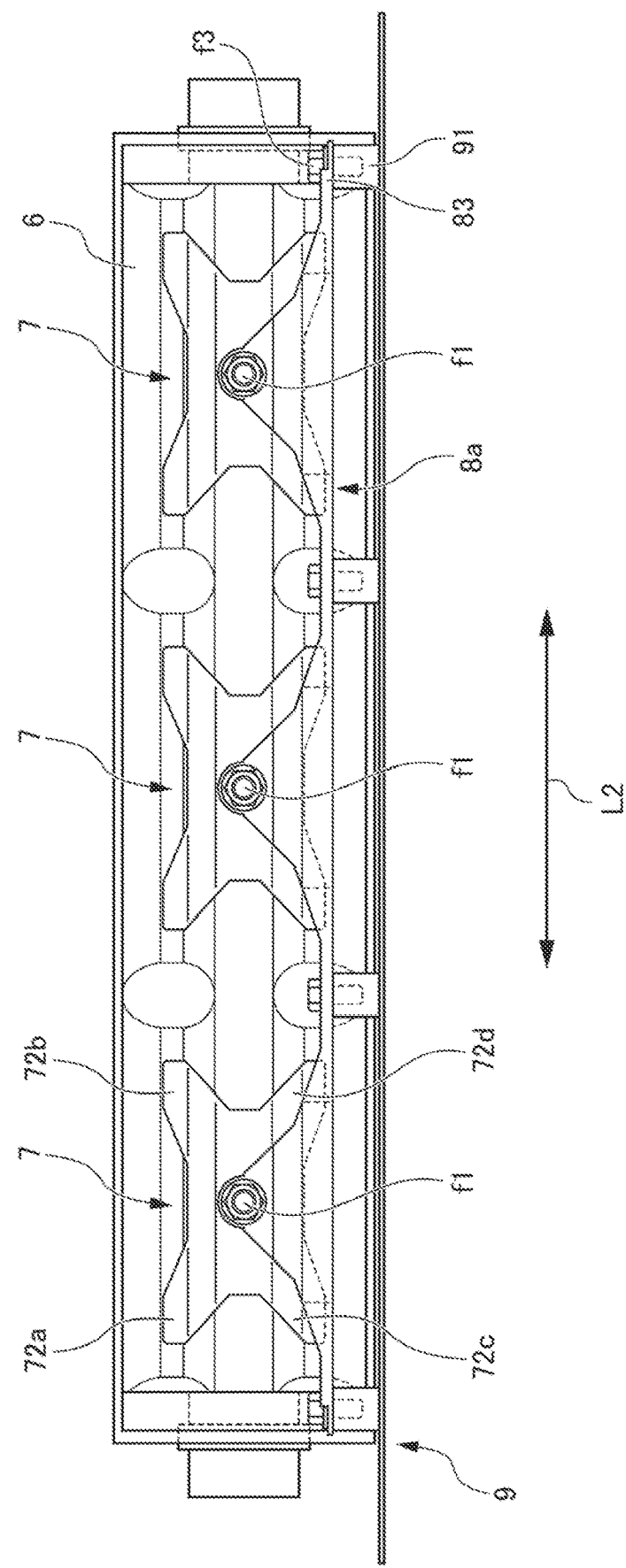
FIG. 6 is a drawing viewing the battery module in FIG. 4 from one lamination direction side.

Three of the pressure plates 7 according to the present embodiment are arranged in a direction L2, which is a direction orthogonal to the lamination direction L1, as shown in FIG. 6. In addition, the load points 72a, 72b, 72c and 72d at which the pressure plate 7 abuts the end plate 6 are arranged at the four symmetrical positions with the fastening nut f1 as reference, in the present embodiment.

(Stay)

Figure 7:
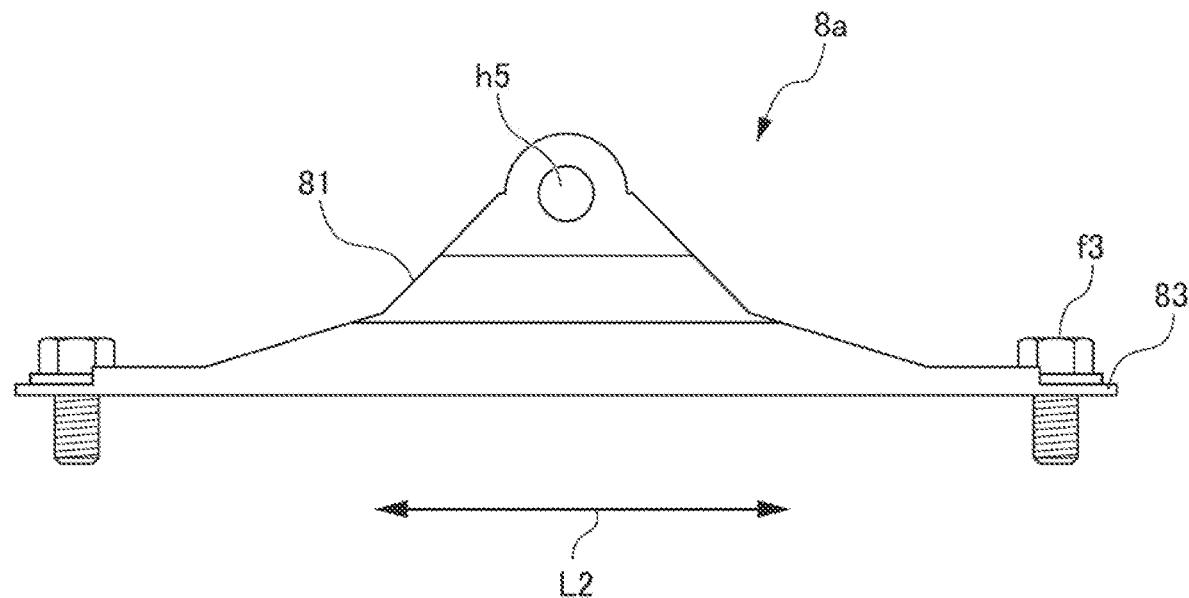
FIG. 7 is a drawing viewing the battery module in FIG. 4 from one lamination direction side.

The stay 8a according to the present embodiment has a connection part 83 with the case 9 at both ends in the direction L2 orthogonal to the lamination direction L1 and/or between fastening members 4, as shown in FIGS. 6 and 7. The fastening bolt f3 is threaded to the connection part 83, and the stay 8a and case 9 are connected. It is thereby possible to further raise the rigidity of the laminate of the battery cells 1a. In addition, the stay 8a is configured by an elastically deformable member, and the rigidity in the lamination direction L1 is set to be lower than the rigidity in a direction orthogonal to the lamination direction L1. The stay 8a can thereby absorb the displacement accompanying expansion and contraction of the laminate of the battery cells 1a. Therefore, irrespective of the battery cells 1a expanding and contracting during use of the battery module 10, it is possible to fix the pressure plate 7 to the case 9 via the stay 8a.

Figure 8:
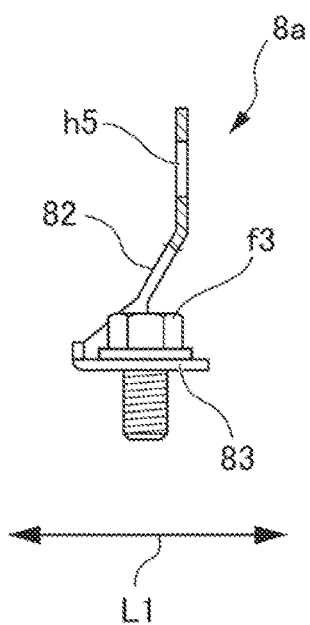
FIG. 8 is a drawing viewing a stay of the battery module in FIG. 7 from a lateral face.

FIG. 7 is a drawing viewing part of the stay 8a arranged at the lamination end side of the battery module 100 from the lamination direction L1, which is the same viewpoint as FIG. 6. The stay 8a has a first sloped part 81 which slopes in a direction widening downward, viewing from the lamination direction L1, as shown in FIG. 7. In addition, as shown in FIG. 8, the stay 8a has a second sloped part 82 which slopes downwards toward the outer side in the lamination direction L1 from the hole part h5, which is a fastening part with the fastening nut f1. According to the above configuration, the stay 8a can absorb the displacement accompanying expansion and contraction of the laminate of the battery cells 1a, by bending deformation in the lamination direction L1. On the other hand, the rigidity relative to the lamination surface of the battery cell 1a rises, and the laminate of battery cells 1a can be preferably fixed.

Figure 9:
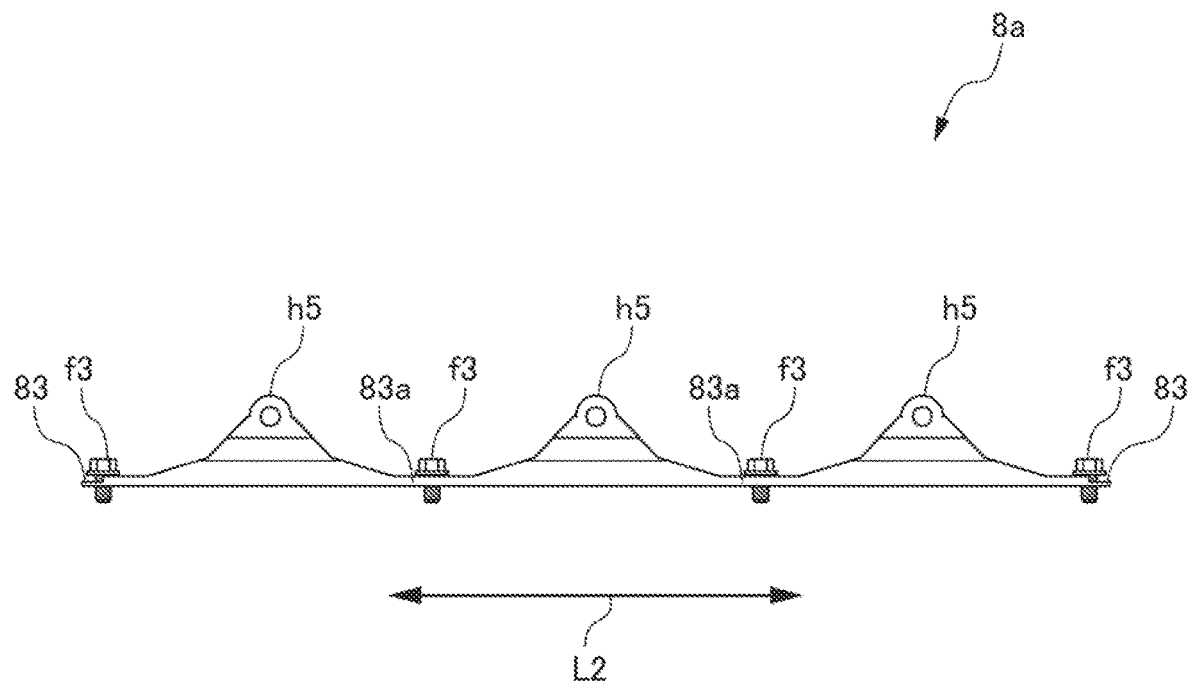
FIG. 9 is a drawing viewing the overall configuration of a stay of the battery module in FIG. 7 from one lamination direction side.

FIG. 9 is a drawing viewing the entirety of the stay 8a used in the battery module 100, in the same viewpoint as FIG. 6. The stay 8a is not provided independently according to the number of fastening members 4 and hole parts h5, and is preferably the stay 8a integrally molded irrespective of the number of fastening members 4 and hole parts h5, as shown in FIG. 9. By integrally molding the stay 8a, it is possible to make the connection part 83a with the case 9 provided between each hole part h5 into a single unit. Therefore, compared to a case of providing the stay 8a independently, then superimposing connection parts 83a and jointly tightening by the fastening bolt f3, a level difference will not arise in the connection part 83a. Therefore, since it is possible to more precisely design the rigidity of the stay 8a for absorbing displacement accompanying the expansion and contraction of each cell laminate, the reliability of the battery module 100 can be improved. In addition, the parts count of the battery module 100 can be reduced, and the assembly workability can be improved. Furthermore, by the fastening member 4 being inserted in the plurality of hole parts h5, and fastening by the fastening nut f1, since similar effects as the locking part 43 of the above-mentioned fastening member 4 are obtained, it is possible to configure the fastening member 4 without providing the locking part 43.

Third Embodiment

Figure 10:
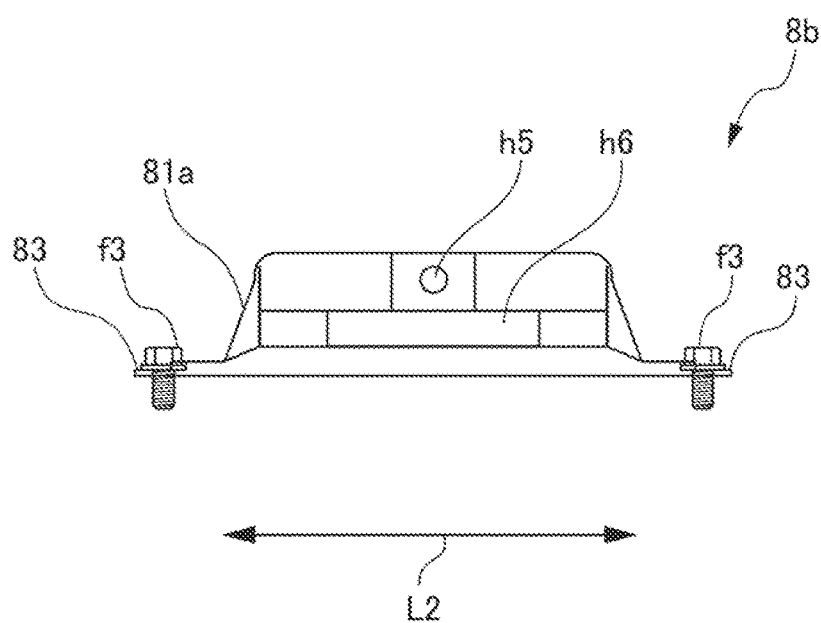
FIG. 10 is a view showing a modified example of a stay of the battery module in FIG. 7.

FIG. 10 is a drawing viewing part of a stay 8b according to the third embodiment in the same viewpoint as FIG. 7. The stay 8b can be applied to a battery module similar to the battery module 100 in which the stay 8a is applied.

The stay 8b, similarly to stay 8a, has the connection part 83 with the case 9, at both ends in the direction L2 orthogonal to the lamination direction L1 and/or between fastening members 4. The fastening bolt f3 is threaded to the connection part 83, and the stay 8b and case 9 are connected. In addition, as shown in FIG. 10, it has a first sloped part 81a. FIG. 11 is a drawing viewing the stay 8b from a direction along the lamination direction L1, similarly to FIG. 8. The stay 8b has a second sloped part 82 similarly to the stay 8a.

The stay 8b has a hole part h6, as shown in FIG. 10. By providing the hole part h6 in the stay 8b, the rigidity in the lamination direction L1 of the stay 8b is easily designed. This is because, by adjusting the size of the hole part h6, it is possible to adjust the rigidity in the lamination direction L1 of the stay 8b. In addition to the above, it is possible to increase the deflection allowance in the lamination direction L1, by the stay 8b having the hole part h6. For this reason, it is possible to more preferably absorb displacement accompanying expansion and contraction of the laminate of the battery cells 1a. The shape of the hole part h6 in FIG. 10 has an opening of substantially square shape; however, the shape of the hole part h6 is not particularly limited.

Although preferred embodiments of the present invention have been explained above, the present invention is not to be limited to the above embodiments, and appropriate modifications are possible.

The above embodiments explain the locking part 43 as engaging in the hole part h3 having the in-plane shape corresponding to the cross-sectional shape of the locking part 43 formed in the end plate 6, for example. It is not limited to the above. The locking part 43 may be provided at an end of the male thread part 41, and fix the end of the male thread part 41.

In the above embodiments, the stays 8, 8a are explained as having formed therein the hole part h5 into which the fastening member 4 can be inserted, and is fastened by the fastening nut f1. It is not limited to the above. The stay of the present invention may be connected at one location or a plurality of locations with the pressure plate.

EXPLANATION OF REFERENCE NUMERALS 10, 100 battery module
1, 1a battery cell
11a, 11b cell laminate
2 power generation element
3 external body
4 fastening member
43 locking part
5, 5a central fixing member
51 connection part
6 end plate
8 stay
81 first sloped part
82 second sloped part
9 case
f1 fastening nut
h1 first through hole
h2 second through hole
h5 hole part
L1 lamination direction

What is claimed is:
1. A battery module comprising:
a cell laminate in which a plurality of battery cells having a power generation element and external body covering the power generation element are laminated;
a fastening member which fastens the cell laminate;

end plates disposed at both ends in a lamination direction of the cell laminate;
a fastening nut which fastens the fastening member and the end plate at an outer side of the cell laminate and at a central part of a lamination surface of the cell laminate;
a stay fastened by the fastening nut; and
a case accommodating the cell laminate,
wherein the cell laminate is fixed to the case by the stay, and
wherein the stay has a first sloped part which slopes in a widening direction from a fastening part with the fastening nut towards a connection part with the case when viewing from the lamination direction.

2. The battery module according to claim 1, wherein rigidity in the lamination direction of the stay is lower than rigidity in a direction orthogonal to the lamination direction of the stay.

3. The battery module according to claim 1, wherein the stay has a second sloped part which slopes downward towards an outer side in the lamination direction of the cell laminate, from the fastening part with the fastening nut.

4. The battery module according to claim 1,
wherein a plurality of the fastening members is arranged, and
wherein the stay includes a plurality of holes through which a part of the fastening member inserts, and is formed integrally.

* * * * *